(No Model.) 8 Sheets—Sheet 1.
W. T. BOTHWELL.
FLUID PRESSURE MOTOR.
No. 540,628. Patented June 11, 1895.
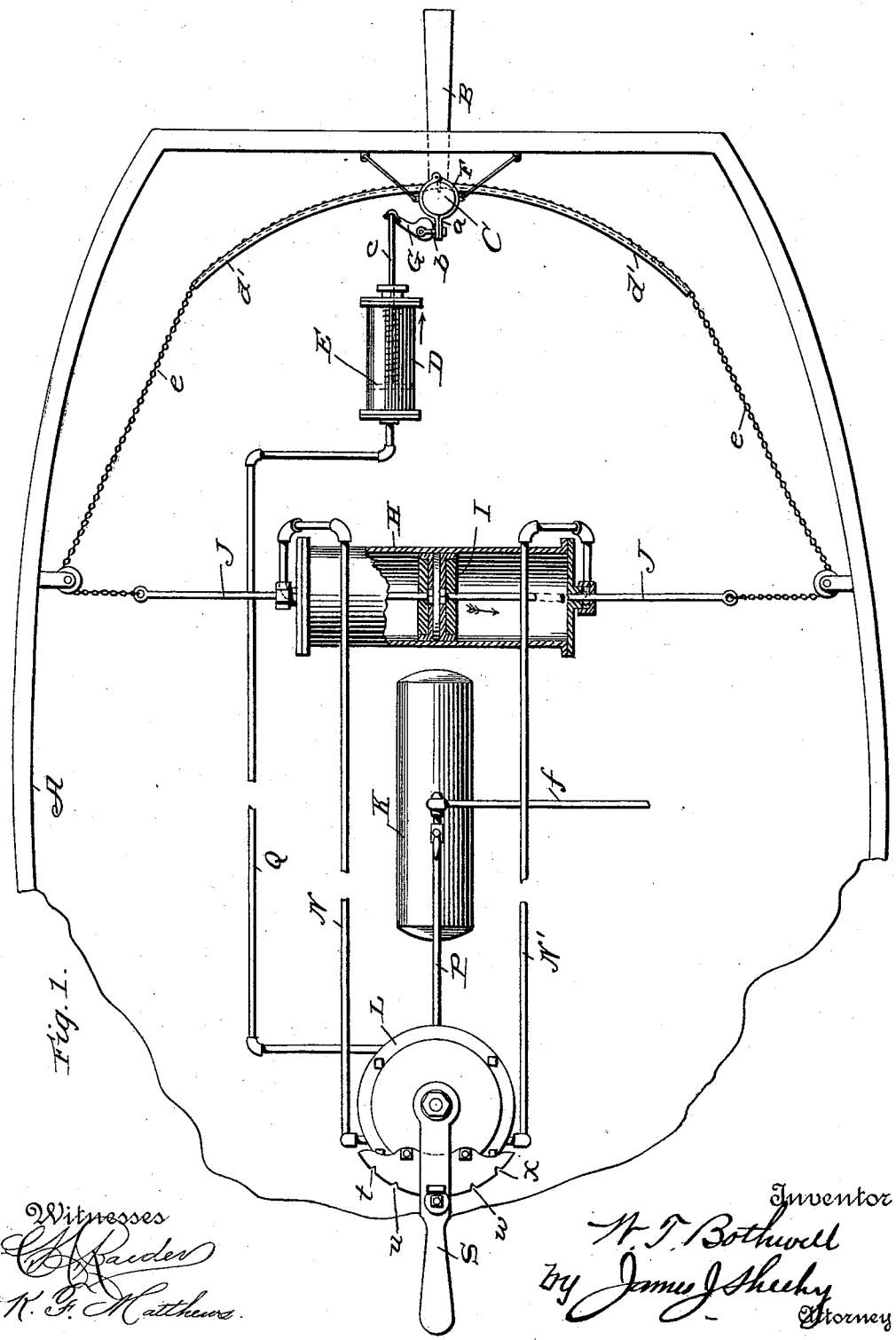

(No Model.) 8 Sheets—Sheet 2.
W. T. BOTHWELL.
FLUID PRESSURE MOTOR.
No. 540,628. Patented June 11, 1895.
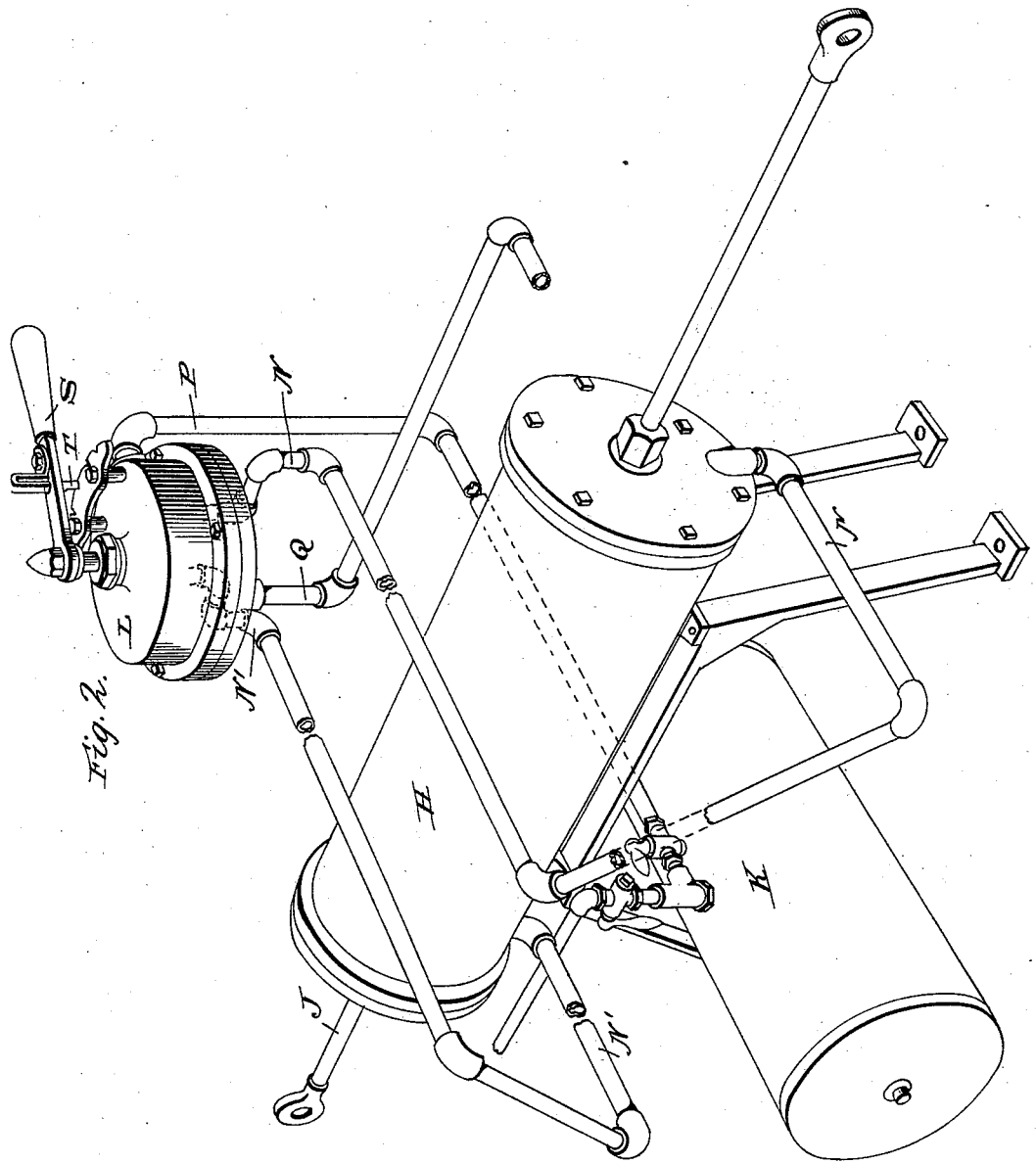

(No Model.)   8 Sheets—Sheet 3.
W. T. BOTHWELL.
FLUID PRESSURE MOTOR.
No. 540,628. Patented June 11, 1895.
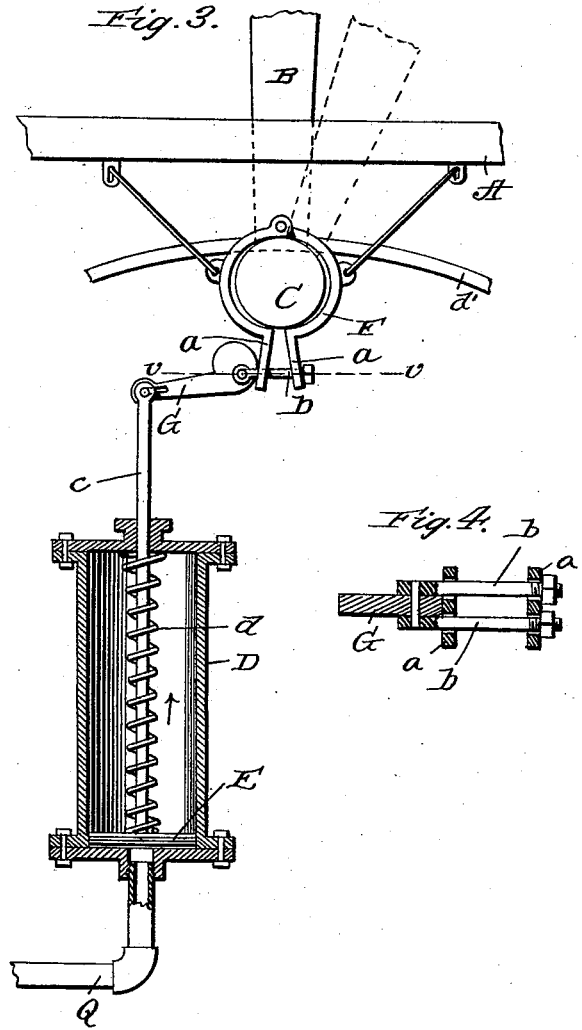

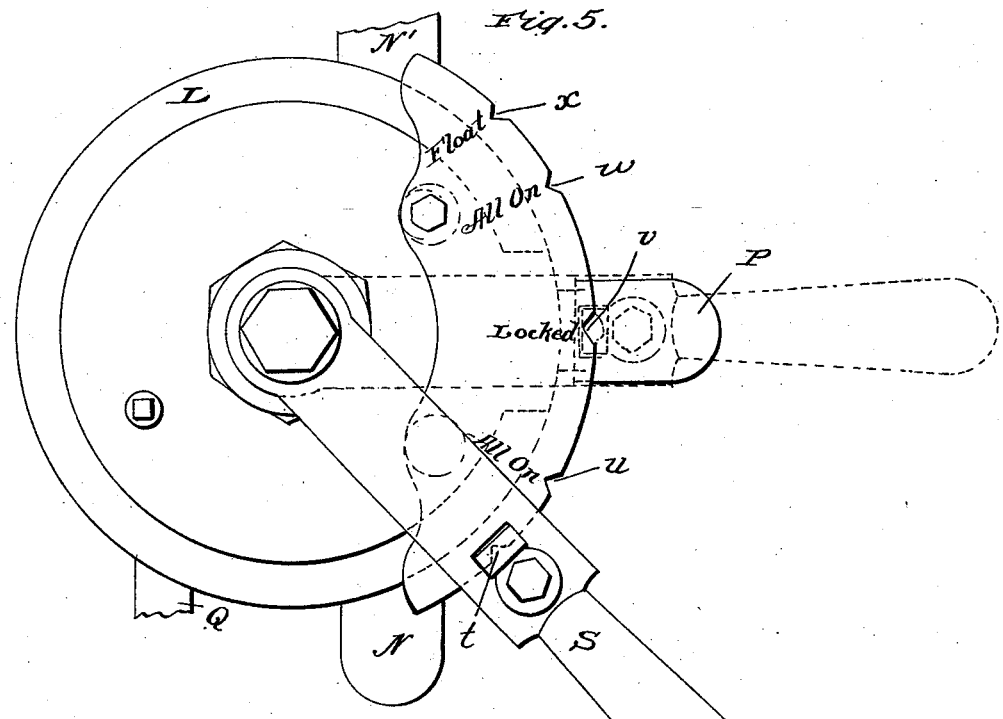
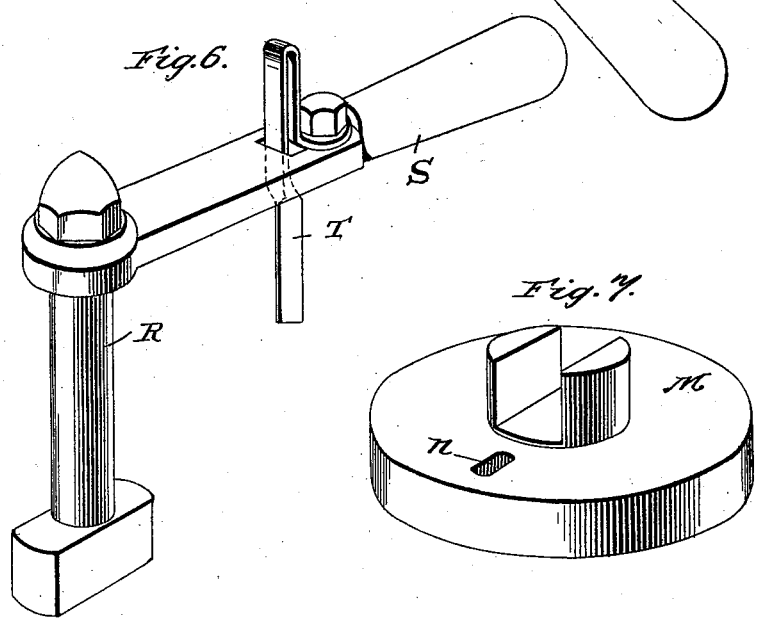
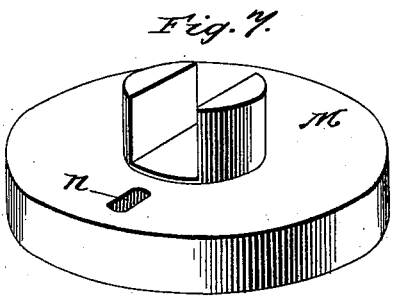

(No Model.) W. T. BOTHWELL. 8 Sheets—Sheet 5.
FLUID PRESSURE MOTOR.

No. 540,628. Patented June 11, 1895.

(No Model.) 8 Sheets—Sheet 6.
W. T. BOTHWELL.
FLUID PRESSURE MOTOR.
No. 540,628. Patented June 11, 1895.
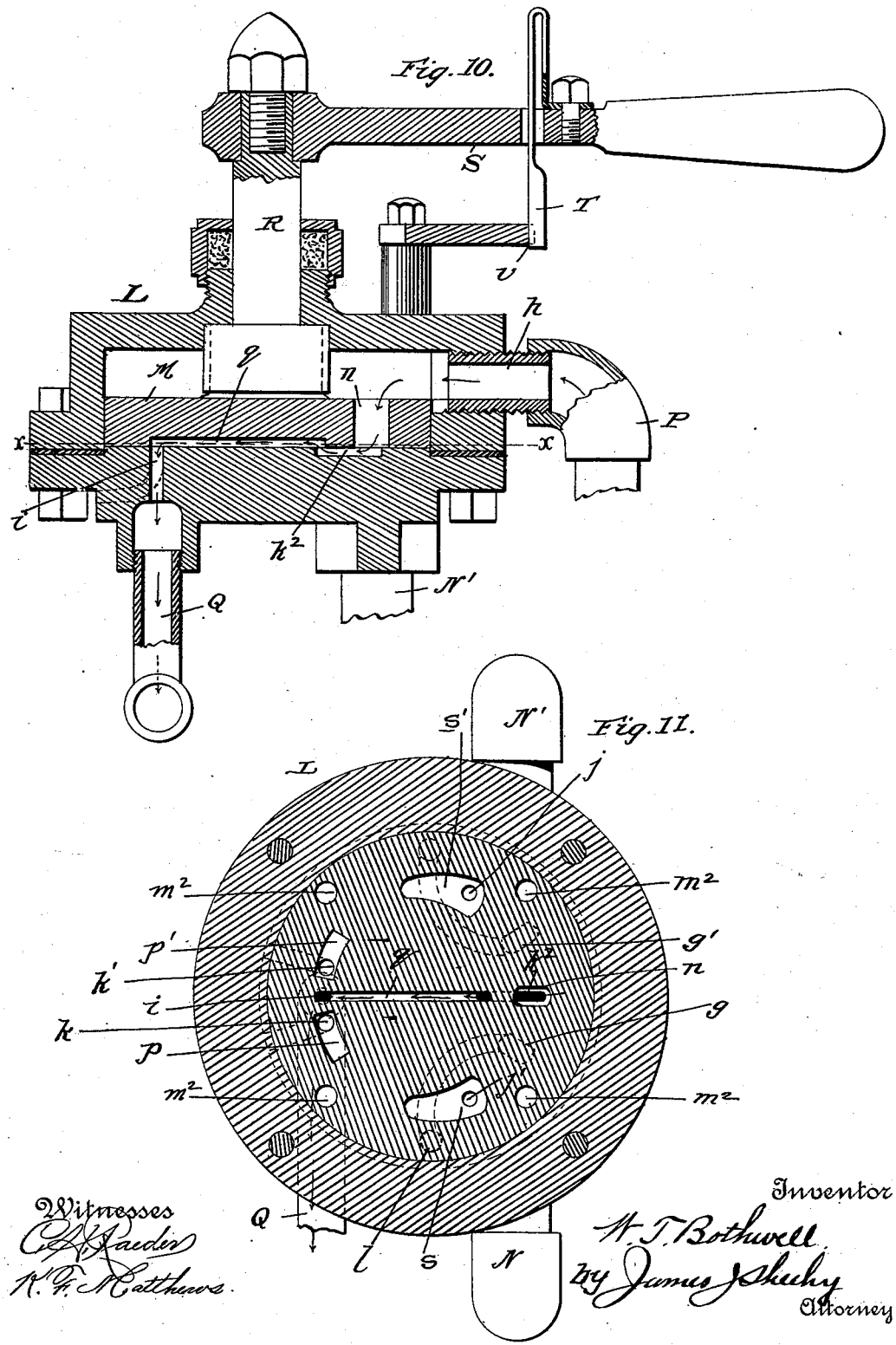
Witnesses
C. H. Raeder
N. F. Matthews
Inventor
W. T. Bothwell
By James J. Sheehy
Attorney
THE NORRIS PETERS CO., PHOTO-LITHO., WASHINGTON, D. C.

(No Model.) 8 Sheets—Sheet 7.

W. T. BOTHWELL.
FLUID PRESSURE MOTOR.

No. 540,628. Patented June 11, 1895.

Witnesses
Inventor
W. T. Bothwell
By James J. Sheehy
Attorney (No Model.) 8 Sheets—Sheet 8.

W. T. BOTHWELL.
FLUID PRESSURE MOTOR.

No. 540,628. Patented June 11, 1895.

Witnesses
Inventor
W. T. Bothwell
by James J. Sheehy
Attorney

THE NORRIS PETERS CO., PHOTO-LITHO., WASHINGTON, D. C.

UNITED STATES PATENT OFFICE.

WILLIAM T. BOTHWELL, OF JERSEY CITY, NEW JERSEY.

FLUID-PRESSURE MOTOR.

SPECIFICATION forming part of Letters Patent No. 540,628, dated June 11, 1895.

Application filed August 14, 1894. Serial No. 520,303. (No model.)

*To all whom it may concern:*

Be it known that I, WILLIAM T. BOTHWELL, a citizen of the United States, residing at Jersey City, in the county of Hudson and State of New Jersey, have invented certain new and useful Improvements in Fluid-Pressure Motors; and I do declare the following to be a full, clear, and exact description of the invention, such as will enable others skilled in the art to which it appertains to make and use the same.

My invention relates to improvements in fluid pressure motors, and it is designed more particularly as an improvement upon the fluid-pressure, vessel-steering mechanism disclosed in my prior application for Letters Patent filed September 28, 1893, Serial No. 486,739.

The general object of my present invention is to provide a quickly and easily operated and reliable fluid-pressure mechanism through the medium of which the rudder of a vessel may be moved in either direction, may be allowed to "float" and may be positively locked in various positions.

Other objects and advantages of the invention will be fully understood from the following description and claims, when taken in connection with the annexed drawings, in which—

Figure 8:
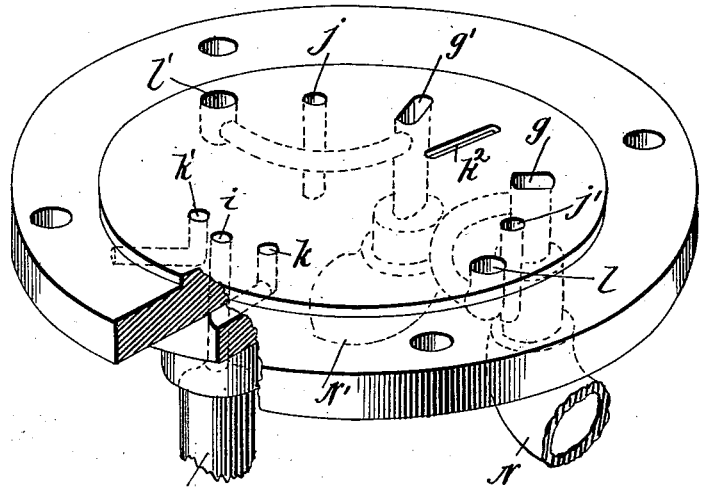
Figure 9:
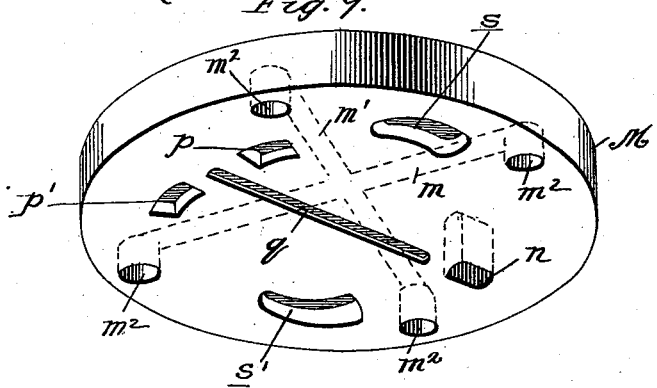
Figures 12, 13:
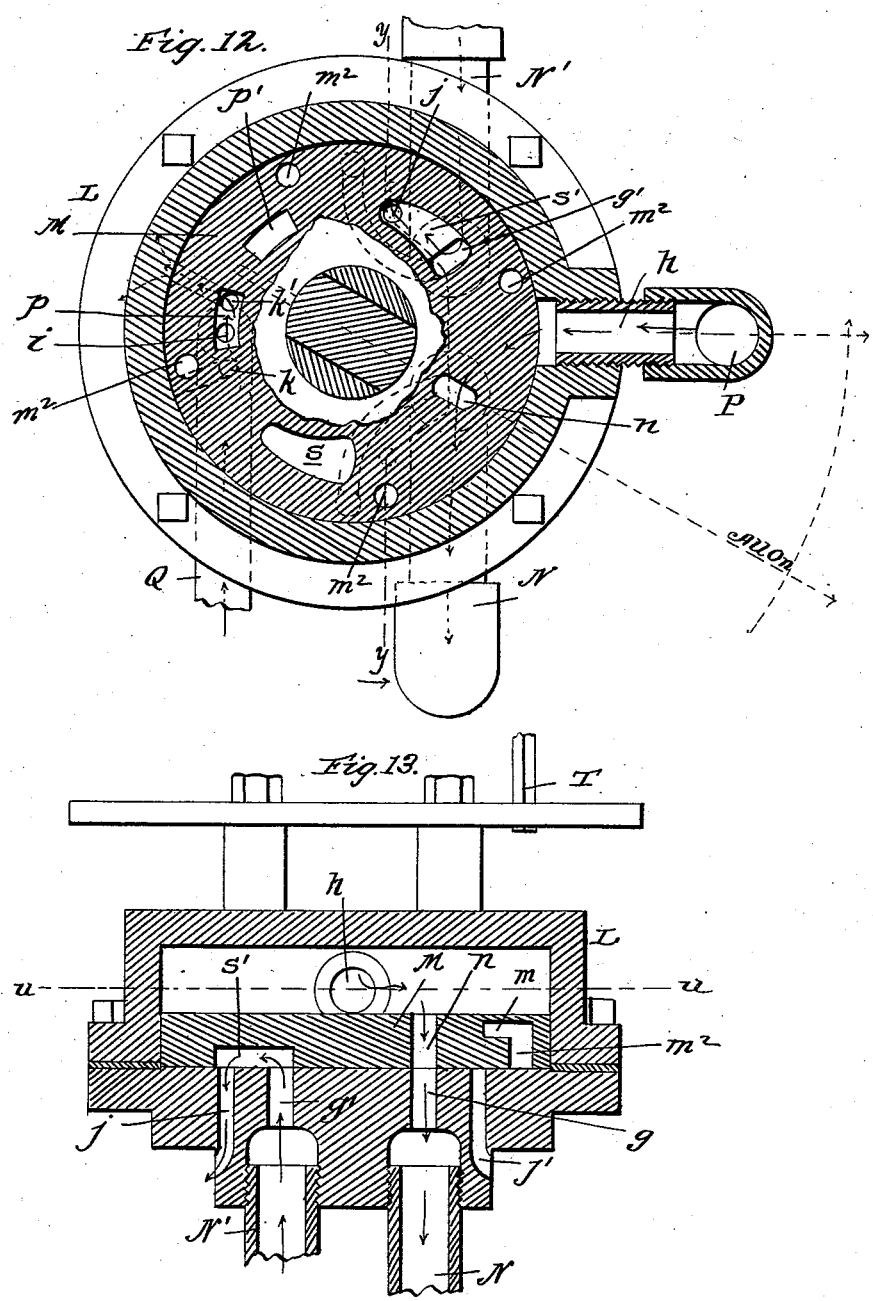
Figure 14:
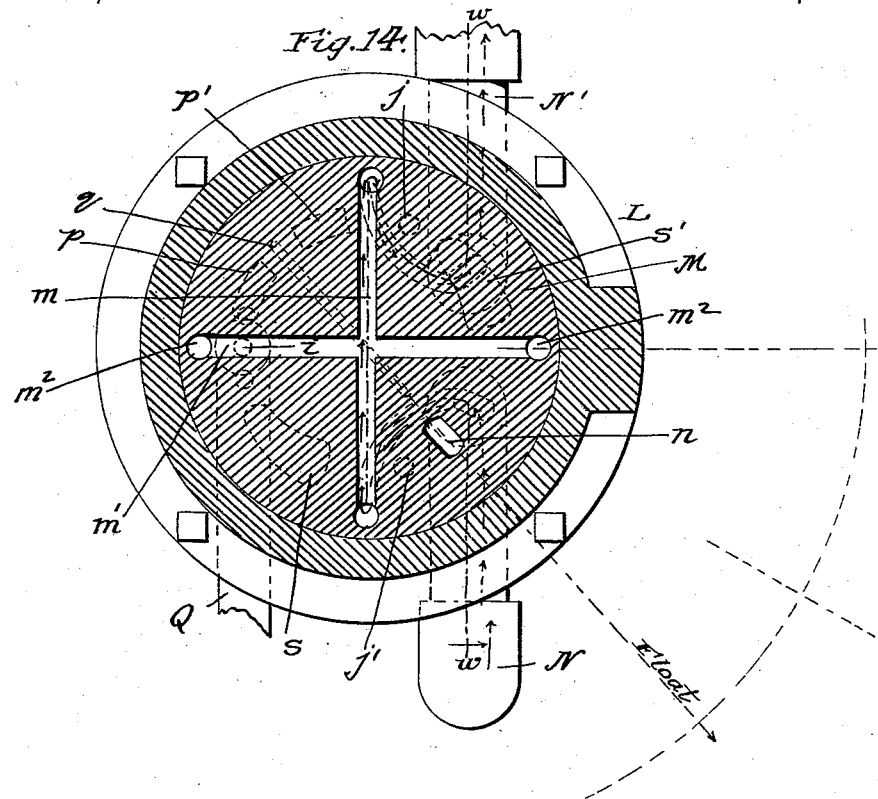
Figure 15:
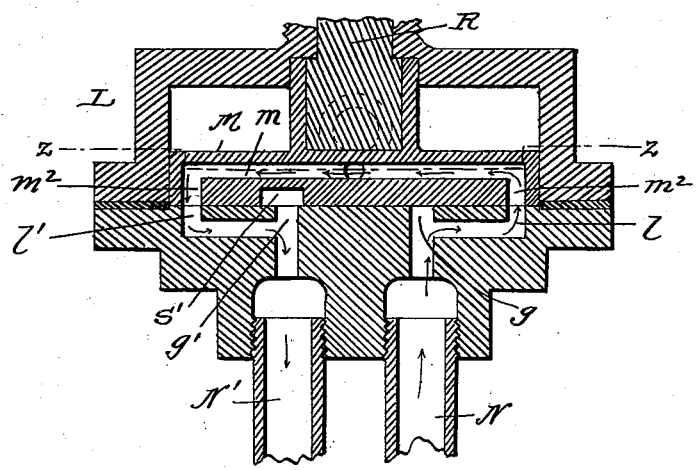

Figure 1 is a detail plan view, with parts in section, illustrating the arrangement of my improved mechanism in a vessel. Fig. 2 is an enlarged perspective view illustrating the storage-reservoir, the piston-cylinder, the valve-casing, and the connections between the same, together with a portion of the pipe which connects the valve-casing and the auxiliary piston-cylinder. Fig. 3 is a detail view, partly in plan and partly in section, illustrating the rudder and its post, the mechanism for locking the same, and the auxiliary cylinder containing the piston through the medium of which the rudder-locking mechanism is actuated. Fig. 4 is an enlarged transverse section taken in the plane indicated by the line $v\ v$ of Fig. 3. Fig. 5 is a plan view of the valve-casing, with the handle shown by full lines in a position to "float" the rudder and by dotted lines to positively lock the rudder against movement. Fig. 6 is a perspective view of the valve stem and handle removed from the casing. Fig. 7 is a detail perspective view of the valve removed from the casing. Fig. 8 is a detail perspective view, partly broken away, illustrating the bottom plate of the valve-casing, together with the pipes leading to the piston-cylinder and the pipe leading to the auxiliary piston-cylinder. Fig. 9 is a perspective view illustrating the under side of the valve. Fig. 10 is a diametrical section of the valve-casing and its appurtenances, with the valve in a position to admit fluid to the auxiliary piston-cylinder, so as to lock the rudder against movement. Fig. 11 is a horizontal section taken in the plane indicated by the line $x\ x$ of Fig. 10. Fig. 12 is a horizontal section of the valve-casing, &c., taken in the plane indicated by the line $u\ u$ of Fig. 13, with the valve partly in horizontal section and in a position to exhaust fluid from the auxiliary piston-cylinder and admit fluid to the right-hand end of the piston-cylinder and move the rudder to starboard. Fig. 13 is a vertical section taken in the plane indicated by the line $y\ y$ of Fig. 12. Fig. 14 is a horizontal section taken in the plane indicated by the line $z\ z$ of Fig. 15, with the valve in a position to permit the fluid to circulate from one end of the piston-cylinder to the other and consequently "float" the rudder; and Fig. 15 is a vertical section taken in the plane indicated by the line $w\ w$ of Fig. 14.

Referring by letter to said drawings, A, indicates a part of a vessel hull. B, indicates the rudder which has a post as C, and may be hung or mounted in any approved manner; and D, indicates what I term the "auxiliary piston cylinder," which contains the piston E, through the medium of which mechanism is actuated to lock the rudder in various positions.

Any suitable rudder locking mechanism that is adapted to be actuated through the medium of a piston, may be employed but I prefer in practice to use the mechanism better illustrated in Figs. 3 and 4, which comprises the hinged or loosely-connected jaws F, which are suitably supported around or on opposite sides of the rudder post and have straight branches as $a$, bolts $b$, which take loosely through the said branches, and a cam lever G, which is pivotally mounted between the bolts $b$, and is loosely connected to one end of the rod $c$, of the piston E, as illustrated. By reason of this construction it will be perceived that when fluid is let into the end of the cylinder D, and the piston is moved in the direction of the arrow (see Figs. 1 and 3), the cam lever G, will be moved so as to clamp the jaws F, upon the rudder post and securely hold or lock the same, while when the fluid is exhausted from the cylinder D, and the piston is returned to its normal position by the spring $d$, the lever G, will be moved so as to permit the jaws F, to open and release the rudder post and rudder.

H, indicates the piston cylinder. This cylinder H, is preferably arranged transverse of the vessel at a suitable distance from the rudder and it contains a piston I, which is preferably of the construction illustrated and is fixed upon the rod J, midway the length thereof. The said rod J, extends through the heads of the cylinder H, as shown, and its ends are connected with the rudder through the medium of any suitable mechanism such as that illustrated, which comprises the curved bar $d'$, which is fixedly connected to the rudder post C, and the chain $e$, which is connected to the bar $d'$, and the ends of the rod J, as illustrated. By thus connecting the rod J, and the rudder, it will be readily perceived that when the piston I, is moved in the direction indicated by arrow (see Fig. 1) the rudder will be swung toward the starboard side of the vessel, and when the movement of the piston is in a direction opposite to that indicated the rudder will be swung toward the port or larboard side of the vessel.

K, indicates the storage reservoir which may be placed at any suitable point and may be charged through the pipe $f$; and L, indicates the casing of the valve M, through the medium of which compressed air or other fluid is manipulated to operate the rudder locking piston E, and the rudder moving piston I. The valve casing L, is placed in the pilot house of the vessel or at any other suitable point and it is suitably chambered to receive the valve M, and is provided (see Figs. 8 and 15) with the ports $g, g'$, for the connection of the pipes N, N′, leading to opposite ends of the cylinder H, the port $h$, for the connection of the supply pipe P, and the port $i$, for the connection of the pipe Q, leading to the auxiliary piston cylinder D, all of which ports $g, g', h$, and $i$, are preferably arranged or disposed as shown. The casing L, is furthermore provided at points adjacent to the ports $g, g'$, with exhaust ports $j, j'$, and at points on opposite sides of the port $i$, with exhaust ports $k, k'$, and said casing also has the recess or channel $k^2$, and the ports or passages $l, l'$, which latter communicate with the interior of the casing at one end and are connected at their opposite ends with the ports or passages $g', g$, at an intermediate point in the length of the same as better shown in Figs. 8 and 15. These latter ports or passages $l, l'$, of the casing are designed to communicate with the diametrical passages $m, m'$, of the valve M, which passages intersect each other as shown and have depending branches $m^2$, at their ends opening through the under side of the valve. The ports $g, g'$, of the casing are designed to communicate with the port $n$, in the valve. The said ports $g, g'$, and the exhaust ports $j, j'$, are designed to communicate with and be connected by the recesses or channels $s$, in the under side of the valve. The casing port $i$, and the exhaust ports $k, k'$, are designed to be connected by the recesses or channels $p, p'$, in the under side of the valve, and said port $i$, is also designed to communicate with the recess or channel $q$, in the under side of the valve; and the recess or channel $k^2$, in the casing is designed to communicate with the port or passage $n$, and the recess or channel $q$, of the valve.

The valve M, is provided with a handle S, through the medium of which it may be readily turned in its seat. This handle S, may be connected with the valve in any suitable or approved manner, but I prefer in practice to connect it to a stem R, (see Fig. 6,) which is journaled in the casing and has an angular enlargement at its lower end to engage an angular seat on the valve, as this construction admits of the valve and handle being readily disconnected for purposes of repair and also permits of the parts of the valve being readily assembled. The said handle S, carries a suitable spring detent or catch as T, and this detent or catch is designed to engage notches $t, u, v, w$, and $x$, formed in the casing, as better shown in Fig. 5, so as to lock the handle and consequently the valve in their various adjusted positions. As will be readily seen by reference to the drawings, the handle S, is so arranged with respect to the ports or passages and recesses of the valve M, that said valve will occupy the position shown in Figs. 10 and 11, when the detent T, is in the notch $v$, the position shown in Figs. 12 and 13, when the detent is in the notch $u$, and the position shown in Figs. 14 and 15, when the detent is in engagement with the notch $t$.

When the detent or catch of the handle S, is in the notch $v$, and the valve is in the position shown in Figs. 10 and 11, fluid will be locked in the cylinder H, on opposite sides of the piston, and fluid will pass from the reservoir K, to the piston cylinder D, so as to move the piston E, in the direction indicated by arrow and thereby lock the rudder through the medium of the mechanism before described; the course of such fluid being through the pipe P, the port or passage $h$, of the casing, the port $n$, of the valve, the recess or channel $k^2$, of the casing, the recess or channel $q$, of the valve, the port or passage $i$, of the casing, and the pipe Q.

When the handle S, is moved to the notch $u$, the recess $p$, in the valve will connect the port $i$, and the exhaust port $k$, and when the valve assumes the position shown in Figs. 12 and 13, said recess or channel $p$, will effect communication between the port or passage $i$, and the exhaust port $k'$, so as to permit the fluid to pass from the cylinder D, and release the rudder, and the fluid in the cylinder H, on the left hand side of the piston I, will exhaust to the open air through the pipe N', the port or passage $g'$, in the casing, the recess or channel $s'$, in the valve and the exhaust port or passage $j'$, in the casing; and at the same time fluid will pass from the reservoir K, to the right hand end of the cylinder H, so as to move the piston I, in the direction indicated by arrow and swing the rudder to starboard; the course of such fluid being through the pipe P, the port or passage $h$, in the casing, the port or passage $n$, in the valve, the port or passage $g$, in the casing and the pipe N.

When the handle S, is moved to the notch $t$, and the valve assumes the position shown in Figs. 14 and 15, the diametrical passage $m'$, will connect the passages $l, l'$, as shown. This will permit the air to circulate from one end of the cylinder H, to the other so that there will be an equal pressure upon both sides of the piston which will allow of a floating or idle swinging movement of the rudder, since the pressure of the tide or waves against one side of the rudder added to the pressure of the fluid on one side of the piston I, will be sufficient to overcome the pressure on the opposite side of the piston and move the same.

By reference to the drawings, more particularly Figs. 12 and 13, it will be obvious that when the handle is moved toward the right from the "locked" position to the notch $w$, the valve M, will assume such a position that the recess $p'$, in the valve will effect communication between the port $i$, and the exhaust port $k$, to relieve the pressure on the piston E, and unlock or release the rudder, and at the same time the recess or channel $s$, in the valve will connect the port $g$, and the exhaust port $j$, to exhaust air from the right hand end of the cylinder H, while the port $n$, in the valve, will be brought over the port or passage $g$, so as to enable the fluid to pass from the storage cylinder or reservoir K, to the left hand end of the cylinder H, and move the piston I, in a direction opposite to that indicated and consequently effect a movement of the rudder to port.

By reference to Figs. 8, 9, 14 and 15, it will also be observed that when the rudder is to port and it is desired to float it, it is simply necessary to move the handle S, to the notch $x$, when the diametrical passage $m$, will connect the passages $l, l'$, so as to permit the air to circulate or pass from one end of the cylinder H, to the other as before described. It will furthermore be observed by reference to the drawings that the rudder may be locked when it is to starboard, when it is to port and when it is in the position shown in Fig. 1, and when the valve handle S, is being moved from the "locked" position to the notch $u$, the recess $p$, of the valve will connect the port $i$, and the exhaust port $k$, so as to relieve the pressure on the piston E, and release the rudder, and that when the detent of the handle is seated in the notch $u$, the recess $p$, will connect the port $i$, and the exhaust port $k'$, so as to hold the cylinder D, open. The same action takes place when the handle S, is moved from the "locked position" to the notch $w$, with the exception that the recess $p'$, first connects the port $i$, and the exhaust port $k'$, and then the port $i$, and the exhaust port $k$. By thus releasing the rudder while the handle S, is being moved from the "locked position" to the starboard and port or larboard position the rudder is always released and free to move before the fluid acts against the piston I, and consequently all straining, breakage and the like, is obviated.

By reason of the construction of my improved valve, the rudder may be locked or may be floated when it is in the position shown in Fig. 1, or when it is swung to starboard or to port without exhausting any of the fluid; the only loss of such fluid being occasioned by the manipulation of the valve to unlock or release the rudder and reverse or change the direction of movement of the piston I, and the rudder. It will also be perceived that when the handle S, is moved from the locked position to any other position the exhaust from the cylinder D, and the consequent release of the rudder will be automatically effected. The loss of fluid incidental to unlocking or releasing the rudder and moving the same is very slight and therefore it will be appreciated that the objectionable necessity of frequently recharging the storage reservoir, is obviated which is an important advantage.

When desirable, a valve, piston cylinder H, and piston I, such as described might be employed in conjunction with a rudder operated by a wheel and the ordinary steering gear, since the air cushioning the piston would relieve the rudder and the steering gear of the shocks and strains produced by abrupt movements of the rudder under the blows of the waves or the action of rough water and would lighten the labor of the men at the wheel and also reduce the risk of accidents that usually attend the work of holding a ship to its course in rough weather. The valve and the cylinder D, and piston E, together with suitable locking mechanism might also be employed in conjunction with a hand-operated rudder so as to hold the rudder in desired positions after it has been moved by hand.

While my improved mechanism is designed especially for use in conjuction with the rudders of vessels, I do not desire to be understood as confining myself to such use as it may be employed to operate car brakes and may also be put to any other use to which it is applicable. I also do not desire to be understood as confining myself to the specific construction and relative arrangement of parts herein described, as such changes or modifications may be made in practice as fairly fall within the scope of my invention.

Having described my invention, what I claim is—

1. The combination of a rudder, a piston cylinder H, a piston in said cylinder, a piston cylinder D, a piston in said cylinder D, a source of fluid pressure supply, a valve interposed between the cylinders H, D, and the source of supply and adapted to effect communication between the source of supply and the piston cylinder H, on opposite sides of the piston, communication between the piston cylinder H, on opposite sides of the piston and an exhaust, communication between the source of supply and the piston cylinder D, and communication between said cylinder D, and an exhaust and suitable means adapted when actuated by the piston of the cylinder D, to lock or hold the rudder against movement, substantially as and for the purpose set forth.

2. The combination of a piston cylinder H, a piston in said cylinder, a piston cylinder D, a piston in said cylinder D, a source of fluid pressure supply and a valve interposed between the cylinders H, D, and the source of supply and adapted to effect communication between the source of supply and the piston cylinder H, on opposite sides of the piston, communication between the piston cylinder H, on opposite sides of the piston and an exhaust, a direct and unbroken communication between opposite sides of the piston so as to permit fluid to flow from the space at one side of the piston into the space at the opposite side thereof, communication between the source of supply and the piston cylinder D, and communication between said cylinder D, and an exhaust, substantially as and for the purpose set forth.

3. The combination of a piston cylinder H, a piston in said cylinder, a piston cylinder D, a piston in said cylinder D, a source of fluid pressure supply, and a valve interposed between the cylinders H, D, and the source of supply and adapted to effect communication between the source of supply and the piston cylinder H, on opposite sides of the piston, communication between the piston cylinder H, on opposite sides of the piston and an exhaust, communication between the source of supply and the piston cylinder D, and communication between said cylinder D, and an exhaust, and also adapted to close communication with the cylinder H, on both sides of the piston simultaneously, at the same time that fluid is admitted to the cylinder D, substantially as and for the purpose set forth.

4. The combination of a piston cylinder H, a piston in said cylinder, a piston cylinder D, a piston in said cylinder D, a source of fluid pressure supply, and a valve interposed between the cylinders H, D, and the source of supply and adapted to effect communication between the source of supply and the piston cylinder H, on opposite sides of the piston, communication between the piston cylinder H, on opposite sides of the piston and an exhaust, a direct and unbroken communication between opposite sides of the piston so as to permit fluid to flow from the space at one side of the piston into the space at the opposite side thereof, communication between the source of supply and the piston cylinder D, and communication between said cylinder D, and an exhaust and also adapted to close communication with the cylinder H, on both sides of the piston simultaneously, at the same time that fluid is admitted to the cylinder D, substantially as and for the purpose specified.

5. The combination of a rudder, a piston cylinder D, a piston in said cylinder, a source of fluid pressure supply, a valve interposed between the piston cylinder and the source of supply and adapted to effect communication between the same and also adapted to effect communication between the piston cylinder and an exhaust, and suitable mechanism adapted when actuated by the piston to lock or hold the rudder against movement, substantially as specified.

6. The combination of a rudder, a piston cylinder D, a piston in said cylinder, a source of fluid pressure supply, means whereby the fluid may be let in and exhausted from the cylinder, and suitable mechanism adapted when actuated by the piston to lock or hold the rudder against movement, substantially as specified.

7. In a fluid pressure mechanism for operating or actuating rudders, and other devices, the combination of a piston cylinder H, a piston in said cylinder, a piston cylinder D, a piston in said cylinder D, a source of fluid pressure supply, a valve casing having a port or passage communicating with the source of fluid pressure supply, ports or passages communicating with the piston cylinder H, at opposite sides of the piston, and a port or passage communicating with the piston cylinder D, and a valve arranged in said casing and adapted to effect communication between the port communicating with the source of supply and the ports communicating with the cylinder H, on opposite sides of the piston, communication between said ports communicating with the cylinder H, and an exhaust, communication between the port communicating with the source of supply and the port communicating with the cylinder D, and communication between the said port communicating with the cylinder D, and an exhaust, all substantially as and for the purpose set forth.

8. In a fluid pressure mechanism for operating or actuating rudders and other devices, the combination of a piston cylinder H, a piston in said cylinder, a piston cylinder D, a piston in said cylinder D, a source of fluid pressure supply, a valve casing having a port or passage communicating with the source of fluid pressure supply, ports or passages communicating with the piston cylinder H, at opposite sides of the piston, and a port or passage communicating with the piston cylinder D, and a valve arranged in said casing and adapted to effect communication between the port communicating with the source of supply and the ports communicating with the cylinder H, on opposite sides of the piston, communication between the said ports which communicate with the cylinder H, on opposite sides of the piston, communication between said ports communicating with the cylinder H, and an exhaust, and communication between the port communicating with the cylinder D, and an exhaust and also adapted to effect communication between the port communicating with the source of supply and the port communicating with the cylinder D, and simultaneously therewith cut off the supply to the cylinder H, and lock the air in said cylinder on opposite sides of the piston, substantially as and for the purpose set forth.

9. In a valve for the purpose described, the combination with a casing having ports or passages as $g, g', h$, and exhaust ports or passages as $j, j'$, of a valve arranged in the casing and having a port or passage $n$, adapted to effect communication between the port or passage $h$, and the ports or passages $g, g'$, alternately and recesses or channels adapted to connect the ports $g, g'$, and the exhaust ports $j, j'$, substantially as and for the purpose set forth.

10. In a valve for the purpose described, the combination with a casing having ports or passages as $g, g', h$, exhaust ports or passages $j, j'$, and ports $l, l'$, communicating at one end with the interior of the casing and at their opposite ends with the ports or passages $g, g'$, at an intermediate point in the length thereof; of a valve arranged in the casing and having a port or passage $n$, adapted to effect communication between the port or passage $h$, and the ports or passages $g, g'$, alternately, recesses or channels $s, s'$, adapted to connect the ports $g, g'$, and the exhaust ports $j, j'$, and the diametrical, intersecting passages $m, m'$, adapted to connect the ends of the ports or passages $l, l'$, substantially as specified.

11. In a valve for the purpose described, the combination with a casing having ports or passages as $g, g', h$, and $i$, exhaust ports or passages as $j, j'$, and $k$, and a recess or channel $k^2$; of a valve arranged in the casing and having a port or passage $n$, adapted to effect communication between the port or passage $h$, and the ports or passages $g, g'$, and the recess or channel $k^2$, alternately, recesses or channels $s, s'$, adapted to connect the ports $g, g'$, and the exhaust ports $j, j'$, a recess or channel adapted to connect the port $i$, and the exhaust port $k$, and a recess or channel $q$, adapted to connect the recess or channel $k^2$, and the port $i$, substantially as specified.

12. In a valve for the purpose described, the combination with a casing having ports or passages as $g, g', h$, and $i$, exhaust ports or passages $j, j'$, exhaust ports or passages $k, k'$, arranged on opposite sides of the port $i$, and a recess or channel $k^2$, of a valve arranged in the casing and having a port or passage $n$, adapted to effect communication between the port or passage $h$, and the ports or passages $g, g'$, and the recess $k^2$, alternately, recesses or channels $s, s'$, adapted to connect the ports $g, g'$, and the exhaust ports $j, j'$, recesses or channels $p, p'$, adapted to connect the port $i$, and the exhaust ports $k, k'$, and a recess or channel $q$, adapted to connect the recess or channel $k^2$, and the port $i$, substantially as specified.

13. The combination of a rudder having a post as C, loosely connected clamping jaws supported upon opposite sides of the post, bolts taking through the said jaws, a cam lever fulcrumed between said bolts and adapted to bear against one of the jaws and clamp the same upon the post, and a suitable means for actuating said cam lever, substantially as specified.

14. The combination of a rudder having a post as C, loosely connected clamping jaws supported upon opposite sides of the post, bolts taking through the said jaws, a cam lever fulcrumed between said bolts and adapted to bear against one of the jaws and clamp the same upon the post, a piston cylinder, a piston arranged in said cylinder and having its rod connected with the cam lever, a source of fluid pressure supply, and means whereby the fluid may be let in and exhausted from the cylinder, substantially as and for the purpose set forth.

In testimony whereof I affix my signature in presence of two witnesses.

WILLIAM T. BOTHWELL.

Witnesses:
 NORMAN L. ROWE,
 HENRY TRAPHAGEN.